3,227,713
NOVEL 2-PHENYLAMINO-4H-5,6-DIHYDRO-1,3-THIAZINE DERIVATIVES

Otto Behner, Cologne-Stammheim, Hans Henecka, Wuppertal-Elberfeld, Friedrich Hoffmeister, Wuppertal-Vohwinkel, Horst Kreiskott, Wuppertal-Elberfeld, Werner Meiser, Wuppertal-Vohwinkel, and Hans Werner Schubert and Wolfgang Wirth, Wuppertal-Elberfeld, Germany, assignors to Farbenfabriken Bayer Aktiengesellschaft, Leverkusen, Germany, a corporation of Germany
No Drawing. Filed July 5, 1963, Ser. No. 293,159
Claims priority, application Germany, July 5, 1962,
F 37,234
14 Claims. (Cl. 260—243)

This invention relates, in general, to organic chemistry, and involves the provision of novel derivatives of 2-phenylamino-4H-5,6-dihydro-1,3-thiazines. In particular, the invention is directed to the provision of compounds of the general class described which are found to possess unusual and outstanding pharmacodynamic activity. The invention additionally involves the provision of several alternate syntheses for the production of these compounds.

It has been known heretofore that one may obtain 2-phenylamino-4H-5,6-dihydro-1,3-thiazines, unsubstituted or monosubstituted in the benzene ring, by reacting aryl isothiocyanates with 3-aminopropanol or trimethylene imine, and cyclicizing the resulting thioureas by heating in concentrated hydrochloric acid [M. Tisler, Arch. pharm. 293, 621 (1960)]. It is further well established that in the reaction of phenyl isothiocyanate with 4-amino-2-chlorobutane there is obtained 2-phenylamino-6-methyl-4H-5,6-dihydro-1,3-thiazine [A. Luchmann, Ber. 29, 1430 (1896)]. These known compounds possess little or no pharmacological activity.

The present invention is based, in part, on the discovery that compounds of the general class described which possess truly outstanding pharmacological activity are produced when:

(a) Phenyl isothiocyanates, which may be substituted once or several times, are added to 3-aminopropanol, substituted in the carbon chain, to form the thiourea, and in which the optionally substituent groups, apart from a methyl group in the 1-position, which may be present include, for example, alkyl, aryl, aralkyl, acyl, hydroxy, dialkylaminoalkyl, or dialkylaminoalkyl members in which both alkyl groups are joined to form a heterocyclic radical, such as piperidinoalkyl, morpholinoalkyl, pyrrolidinoalkyl, alkyl piperazinoalkyl and hexamethyleneiminoalkyl, and the thioureas thus produced are treated with appropriate acids to effect ring closure; or (b) 3-halopropylamines which, again in addition to a methyl group in the 1-position, may also contain any of the above-enumerated substituents, are reacted with substituted or unsubstituted phenyl isothiocyanates; or (c) N-phenylthioureas which may be substituted in the benzene ring, are reacted with 1,3-dihalopropanes or 3-halopropylamine salts, which, apart from a methyl group in the 3-position, may also contain any of the above-enumerated substituents; or (d) 3-halopropyl isothiocyanates which, apart from a methyl group in the 3-position, may also contain any of the above-enumerated substituents, are reacted with aromatic amines; or (e) 2-amino, 2-mercapto- or 2-alkylmercapto-4H-5,6-dihydro-1,3-thiazines which, in addition to a methyl group in the 6-position, may also contain any of the above-enumerated substituents, are reacted with aromatic amines in the presence of acids.

As indicated above, typical preferred substituent groups of said reaction components include lower alkyl, aryl, aralkyl, alkoxy, halogen, trihalomethyl, nitro, acylamino, hydroxy, dialkylaminoalkyl, or such dialkylaminoalkyl members in which the two alkyl groups are joined to form a heterocyclic group, such as piperidinoalkyl, morpholinoalkyl, pyrrolidinoalkyl, and alkylpiperazinoalkyl.

The foregoing reactions utilized in the production of the unique compounds of the invention can be effected in aqueous, aqueous-alcoholic or alcoholic solution, as well as in aliphatic or aromatic solvents, or in the melt, the particular choice of a suitable solvent or diluent merely being determined in established manner having reference to the stability and reactivity of the specific reaction components in each instance. In this connection, the use of solvents or diluents generally proves to be expedient, but is not absolutely necessary.

As pointed out hereinabove, the products of the present invention are unique in the fact that they possess a surprising variety of pharmacodynamic activities. Thus, in particular, those derivatives which are substituted several times in the phenyl nucleus exhibit a morphine-like analgetic action, which enables one to perform, for example, surgical operations on warm-blooded animals, affecting even the abdomen, without the "EEG" showing the classic indications of complete anaesthesia. On the other hand, in oral administration of these derivatives they act as potent tranquilizers. In addition, certain of the new compounds exhibit a noteworthy coronary activity, in the sense of increasing the oxygen saturation in coronary sinus vein blood in, for example, the narcotized dog, following intravenous injection of even merely small doses. Additionally, certain of the compounds are possessed of strong stimulant effects.

In general, the base products of the invention form readily soluble salts with acids.

It is believed that the invention may be best understood by reference to the following specific examples illustrating the application of the foregoing principles and procedures in the production of typical compounds of the invention:

EXAMPLE I 1-phenyl-3-aminopropanol-(1), in amount of 19.0 grams (0.126 mole), was dissolved in 100 cubic centimeters of ether and the resulting solution was treated dropwise, with vigorous stirring, with a solution of 20.5 grams (0.126 mole) of 2,6-dimethylphenyl isothiocyanate in 50 cubic centimeters of ether. The mixture was then heated for 3 hours under reflux, the ether removed in vacuum, and the residue was treated with 150 cubic centimeters of concentrated hydrocholric acid for 15 minutes on the steam bath. The hydrochloride of the reaction product deposited at the bottom. It was cooled with ice water, the aqueous phase was decanted, the salt taken-up in 1.3 liters of water, clarified with animal charcoal, and then rendered alkaline with a dilute caustic soda solution. The freed base was filtered off with suction, dried, and recrystallized from toluene-ligroin (1:1). There was obtained 22.8 grams (61 percent of the theoretical) of the product 2-(2,6-dimethylphenylamino)-6-phenyl-4H-5,6-dihydro-1,3-thiazine in the form of colorless crystals of melting point 150–152° C.

Analysis.—$C_{18}H_{20}N_2S$ (296.4):

|  | C | H | N | S |
|---|---|---|---|---|
| Calculated | 72.94 | 6.80 | 9.45 | 10.82 |
| Found | 73.06 | 7.10 | 9.45 | 10.74 |

EXAMPLE II 3-chloro-2-hydroxy-propylamine-(1)-hydrochloride [produced according to Ber. 50, 822 (1927)], in amount of 14.6 grams, was dissolved in 75 cubic centimeters of absolute alcohol and mixed with 27 cubic centimeters of an alcohol potassium hydroxide solution (3.7 N) while cooling. Following brief stirring, the potassium chloride was filtered off with suction, and the alcoholic solution was mixed with 18.35 grams (0.1 mole) of 2-methyl-5-chlorophenyl isothiocyanate. The resulting mixture was heated to the boil for 6 hours, and the alcohol was then evaporated in vacuum. By triturating with acetone, the hydrochloride of 2-(2-methyl-5-chlorophenylamino) - 5 - hydroxy - 4H - 5,6 - dihydro-1,3-thiazine crystallized out in pure form in a yield of 22 grams. It has the melting point of 163° C. If required, this product can be re-precipitated, while hot, from absolute alcohol and ethyl acetate (1:2).

Analysis.—$C_{11}H_{13}ClN_2OS \cdot HCl$ (293):

|  | C | H |
|---|---|---|
| Calculated | 45.0 | 4.77 |
| Found | 45.16 | 4.8 |

Having reference to the formula set forth below, and in an analogous manner to that described in the foregoing Examples I and II, the compounds set forth in the following table were produced, in good yields, from the corresponding isothiocyanates and substituted aminopropanols. The heretofore unknown isothiocyanates were produced from the amines and thiophosgene is aqueous ethylene chloride in the presence of calcium carbonate at 20° C.

The 3-(3-methoxyphenyl)-3-aminopropanol-(1) required as the starting material for the production of the fifth compound listed in the table was produced from 3-methoxy-β-aminohydrocinnamic acid ethyl ester by reduction with lithium aluminum hydride in ether (melting point 41–45° C.; boiling point 105–115° C. at 0.01 mm. Hg; yield: 57 percent of the theoretical).

The 3-(3-chlorophenyl)-3-aminopropanol-(1) required as starting material for the production of the sixth compound listed in the table was obtained from 3-chloro-β-amino-hydrocinnamic acid ethyl ester by reduction with lithium aluminum hydride in ether (melting point 61–65° C.; yield: 80 percent of the theoretical).

The mixture was heated to 150° C., whereupon a reaction set is accompanied by a rise in temperature. The reaction mixture was maintained at about 150° C. for 15 minutes and then permitted to cool. The cold melt was dissolved in water, boiled with animal charcoal and filtered. The desired 2-(2,6-dimethylphenylamino)-6-phenyl-4H-5,6-dihydro-1,3-thiazine precipitated from the aqueous solution with a dilute caustic soda solution melts at 150–152° C. [from toluene-ligroin (1:1)] and was found to be identical with the compound described in Example I.

EXAMPLE IV

A solution of 42.3 grams (0.2 mole) of 3-chloro-1-phenylpropylisothiocyanate-(1) [produced from 3-chloro-1-phenylpropylamine-(1) hydrochloride and thiophosgene in aqueous ethylene chloride in the presence of calcium carbonate at 20° C.], and 18.6 grams (0.1 mole) of aniline in 100 cubic centimeters of absolute xylene was stirred under reflux for 3 hours. An oil which separated soon became crystalline. It was recrystallized from alcohol-ether, to yield the hydrochloride of 2-phenylamino-4-phenyl-4H-5,6-dihydro-1,3-thiazine of melting point 146–149° C., which was found to be identical with the fourth compound listed in Table I.

EXAMPLE V

An intimate mixture of 11.2 grams (0.05 mole) of 2 - methylmercapto - 4 - phenyl - 4H - 5,6 - dihydro - 1,3-thiazine and 6.5 grams (0.05 mole) of aniline hydrochloride was heated in the oil bath. At about 80° C., evolution of methyl-mercaptan commenced, and became vigorous at 110° C. As soon as the mixture had become fluid, it was stirred. It was then heated for 45 minutes at 120° C. and, after cooling, the melt was dissolved in water and the base precipitated with a caustic soda solution. This base was dissolved in ether and by introducing gaseous HCl, it was precipitated as the hydrochloride. After recrystallizing from alcohol/ether, the hydrochloride of the desired compound, 2-phenylamino-4-phenyl-4H-5,6-dihydro-1,3-thiazine melts at 147–150° C. It was found to be identical with the fourth compound listed in Table I.

*Table I*

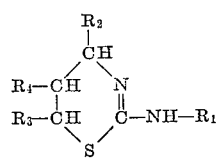

| R₁ | R₂ | R₃ | R₄ | Formula | Melting point, ° C. | Produced according to— |
|---|---|---|---|---|---|---|
| Phenyl | H | Phenyl | H | $C_{16}H_{16}N_2S$ | 209–110 | Example 1. |
| 3-methoxyphenyl | H | do | H | $C_{17}H_{18}N_2OS$ | 145–146 | Example 1+. |
| 2,6-dimethylphenyl | H | do | H | $C_{18}H_{20}N_2S$ | 150–152 | Example 1. |
| Phenyl | Phenyl | H | H | $C_{16}H_{16}N_2S \cdot HCl$ | 146–150 | Do. |
| 2-methyl-5-chlorophenyl | 3-methoxyphenyl | H | H | $C_{18}H_{19}ClN_2OS$ | 124–128 | Do. |
| 2,6-dimethylphenyl | 3-chlorophenyl | H | H | $\begin{cases} C_{18}H_{19}ClN_2S \\ C_{18}H_{19}ClN_2S \cdot HCl \end{cases}$ | 130–131 / 210–212 | Do. |
| Phenyl | H | H | OH | $C_{10}H_{12}N_2OS \cdot HCl$ | 150 | Example 2. |
| 2,6-dimethylphenyl | H | H | OH | $C_{12}H_{16}N_2OS \cdot HCl$ | 189 | Do. |
| 2-methyl-5-chlorophenyl | H | H | OH | $C_{11}H_{13}ClN_2OS \cdot HCl$ | 163 | Do. |
| 2,4,5-trichlorophenyl | H | H | OH | $C_{10}H_9Cl_3N_2OS \cdot HCl$ | 209 | Do. |
| 2,3-dichlorophenyl | H | H | OH | $C_{10}H_{10}Cl_2N_2OS \cdot HCl$ | 168 | Do. |
| 2,5-dimethoxyphenyl | H | H | OH | $C_{12}H_{16}N_2O_3S \cdot HCl$ | 148 | Do. |

EXAMPLE III 2,6 - dimethylphenyl - thiourea, in amount of 18.0 grams (0.1 mole), and 29.5 grams (0.1 mole) of 3-bromo-3-phenylpropylamine hydrobromide (produced from 3-hydroxy-3-phenyl-propylamine and hydrobromic acid/glacial acetic acid at room temperature: melting point 132° C.), were intimately admixed and melted together.

The 2 - methylmercapto - 4 - phenyl - 4H - 5,6 - dihydro-1,3-thiazine was obtained from 3-phenyl-3-aminopropylbromide hydrobromide and carbon disulphide in aqueous alkaline solution with subsequent methylation of the mercapto compound with dimethyl sulphate and potash in acetone.

What is claimed is:

1. A chemical compound represented by the formula:

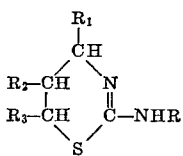

wherein R is selected from the group consisting of lower alkenylphenyl, di-lower alkyl-phenyl, lower alkyl-chlorophenyl, phenyl, lower alkoxyphenyl, di-lower alkoxyphenyl, dichlorophenyl, and trichlorophenyl; $R_1$ is selected from the group consisting of hydrogen, phenyl, lower alkoxyphenyl and chlorophenyl; $R_2$ is selected from the group consisting of hydrogen and hydroxy; $R_3$ is selected from the group consisting of hydrogen, phenyl, lower alkoxyphenyl and chlorophenyl; and wherein at least one of $R_1$, $R_2$, and $R_3$ is not hydrogen.

2. The chemical compound, 2-(2,6-dimetylphenylamino)-6-phenyl-4H-5,6-dihydro-1,3-thiazine.

3. The chemical compound, 2-(2-methyl-5-chlorophenylamino)-5-hydroxy-4H-5,6-dihydro-1,3-thiazine.

4. The chemical compound, 2-(phenylamino)-6-phenyl-4H-5,6-dihydro-1,3-thiazine.

5. The chemical compound, 2-(3-methoxyphenylamino)-6-phenyl-4H-5,6-dihydro-1,3-thiazine.

6. The chemical compound, 2-(phenylamino)-4-phenyl-4H-5,6-dihydro-1,3-thiazine.

7. The chemical compound, 2-(2-methy-5-chorophenylamino) - 4 - (3 - methoxyphenyl) - 4H - 5,6 - dihydro- 1,3-thiazine.

8. The chemical compound, 2-(2,6-dimethylphenylamino)-4-(3-chlorophenyl)4H-5,6-dihydro-1,3-thiazine.

9. The chemical compound, 2-(phenylamino)-5-hydroxy-4H-5,6-dihydro-1,3-thiazine.

10. The chemical compound, 2-(2,6-dimethylphenylamino)-5-hydroxy-4H-5,6-dihydro-1,3-thiazine.

11. The chemical compound, 2-(2-methyl-5-chlorophenylamino)-5-hydroxy-4H-5,6-dihydro-1,3-thiazine.

12. The chemical compound, 2-(2,4,5-trichlorophenylamino)-5-hydroxy-4H-5,6-dihydro-1,3-thiazine.

13. The chemical compound, 2-(2,3-dichlorophenylamino)-5-hydroxy-4H-5,6-dihydro-1,3-thiazine.

14. The chemical compound, 2-(2,5-dimethoxyphenylamino)-5-hydroxy-4H-5,6-dihydro-1,3-thiazine.

References Cited by the Examiner

Luchmann, "Chemische Berichte," vol. 29, p. 1430 (1896).

Tisler, "Archive der Pharmazie," vol. 293, p. 621–626 (1960).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,227,713                                January 4, 1966

Otto Behner et al.

It is hereby certified that error appears in the above numbered patent requiring correction and that the said Letters Patent should read as corrected below.

Column 4, line 69, beginning with "The 2-methylmercapto" strike out all to and including "disulphide in" in line 75, same column 4, and insert instead -- The 2-methylmercapto-4-phenyl-4H-5,6-dihydro-1,3-thiazine was obtained from 3-phenyl-3-amino-propylbromide hydrobromide and carbon disulphide in aqueous alkaline solution with subsequent methylation of the mercapto compound with dimethyl sulphate and potash in acetone.

What is claimed is:    --.

Signed and sealed this 29th day of November 1966.

(SEAL)
Attest:

ERNEST W. SWIDER                              EDWARD J. BRENNER
Attesting Officer                            Commissioner of Patents